UNITED STATES PATENT OFFICE 2,614,993

PREPARATION OF SILICA SOLS FROM SILICON METAL

Victor I. Montenyohl, West Chester, Pa., and Carl M. Olson, Newark, Del., assignors to E. I. du Pont de Nemours & Company, Wilmington, Del., a corporation of Delaware No Drawing. Application August 10, 1949,
Serial No. 109,622

6 Claims. (Cl. 252—313)

This invention relates to the preparation of silica sols, and more particularly to the reaction of metallic silicon with water.

The reaction between silicon and water to form a sol of hydrated silica and by-product hydrogen has been little known and of no practical importance. The reaction was first observed by Moissan and Siemens, and although subsequent investigators denied its occurrence, it is now established. Recently it has been found that ammonia and organic amines facilitate the reaction, apparently acting as catalysts. Even this discovery by itself would not make the silicon-water reaction capable of producing a commercially-practical sol; the silicon becomes quickly coated with $SiO_2$, which acts as a stabilizer and inhibits further conversion, thus rendering the reaction relatively slow and inefficient. The best sols of practical concentration have been made by prior art ion-exchange processes. A dilute solution of sodium silicate is passed through a column containing an ion-exchange resin of a type that substitutes $H^+$ or $NH_4^+$ for $Na^+$; the resultant sol is evaporated under reduced pressure to raise the $SiO_2$ concentration.

It is among the objects of this invention to overcome the above and other difficulties encountered in prior art methods of preparing silica sols from silicon and water. A particular object is to increase the efficiency of the reaction of Si with $H_2O$ in the presence of a weak base, by removing the silica coating from the silicon as it is formed. A further object is to devise a method for preparing fine particle size silica sols.

The above and other objects are realized by our invention which broadly comprises subjecting silicon to attrition while the silicon is submerged in an aqueous solution of either ammonia or a basic alkyl- or aryl-substituted compound of ammonia, namely an aliphatic or aromatic amine. We have discovered that commercially-valuable sols may be obtained by conducting the Si-$H_2O$ reaction under conditions whereby the Si is thus mechanically scoured to remove from its surface, as formed, the coating of $SiO_2$. The silicon-water reaction is a surface one, the rate of which depends upon the amount of clean surface available to the water. The employment of attritive action serves to cleanse this silicon in an exceedingly efficient manner.

In one more specific embodiment of our invention wherein we desire to prepare a hydrophobic silica sol, we submerge silicon in a dilute aqueous solution of ammonia, and subject the silicon to attrition while so submerged, for instance, by conducting the reaction in a vented ball mill.

In another specific utilization of our process, whereby hydrophilic silica sols are produced, we subject the silicon to attrition while it is submerged in a dilute aqueous solution of a relatively basic, water-soluble aliphatic or aromatic amine, i. e., an alkyl- or aryl-substituted ammonia compound. The resulting sols are fundamentally different from the sols prepared using ammonia, in that they are hydrophilic, hence of higher viscosity and with much greater tendency to gel.

It is the combination of attritive action with the presence of a weak base (ammonia or amine) which provides the augmented efficiency of our process as compared to prior art reactions. The most commercially-useful method of effecting this attrition is generally by means of a vented ball mill, such as, say, a steel or porcelain mill, or one of chemical stone ware, perhaps with a flint lining or the like. Essentially any material of construction which is harder than the silicon is of course operable. The same considerations hold true for the grinding balls used within the mill, which may be steel or flint or the like. Sometimes we find it advisably simply to use lumps of silicon itself as both the reactant and the grinding means. Such ball mill should of course be provided with a vent, some means for allowing removal of the hydrogen evolved in the reaction. A particular advantage of our process is that preparation of the sols may be continuous. It is possible to feed the weak base solution continuously to a ball mill and continuously to drain off the product sol, by utilizing coaxial tube feeders, the exit tube then serving also as the hydrogen escape vent. Such a procedure is well known in the milling art, and it and other similar conventional operations are contemplated in the practice of our invention.

The second particularly critical factor is the addition of one of the hereinabove-mentioned weak bases to the attrition operation. The presence of ammonia or its amine derivatives serves to implement the Si-$H_2O$ reaction. Further, the product sol may be easily controlled thereby as to its hydrophobic or hydrophilic characteristics, ammonia providing sols of the former type; its derivatives, the latter. Sometimes, both ammonia and an amine may be utilized in the same reaction and we have discovered that even though ammonia be used, the addition also of only about 2 to 5% of an amine serves to render the product hydrophilic. It is naturally important that any amine chosen be basic in character, and water-soluble at least to the extent of the 1% minimum concentration commonly used. We have found that those amines having basicities at room temperatures of between pH 6 and pH 12 are usually preferable; those of pH less than 6 are quite inefficient; while ones of pH materially greater than 12 may tend to form silicates rather than $SiO_2$ sols. As particularly useful amines may be mentioned diethylamine, triethylamine, monoethanolamine, triethylenetetramine, allylamine, cyclohexylamine, 2-hydroxy-3-ethylpiperidine, and generally those amine derivatives of ammonia which have from one to eight carbon atoms.

The temperatures employed, the severity of the milling (the equipment used and the length of time milled), the amount of liquid present, and similar factors will have their interdependent effect on the resulting sol, its $SiO_2$ concentration and particle size. Generally it may be said that from 1 to 28% $NH_3$ (by weight), or gram-moles $NH_3$: gram-atoms Si ratios of between 0.1 and 30, represent practical ranges of ammonia concentration, while from 1 to 10% (by weight) and a 0.5 to 6.0 ratio range are preferred. There is only slight difference in conversion to the sol between the 28% system and a 1-10% $NH_3$ system, so that it would seem desirable usually to operate at the lower $NH_3$ concentrations. In utilizing amines, from 1 to 35% by weight is a useful range, while, say, 2 to 5% is enough for rendering the sols hydrophilic. The additional factor of desired particle size in the product must also be considered where ammonia is the base employed. The lower the particle size sought, generally the less the $NH_3$ content necessary. At between 1% and 5% $NH_3$ concentration, the sol is almost completely transparent and the $SiO_2$ has a particle size of about 15 millimicrons or considerably less, while at 28% $NH_3$ its size may be, say, 75 to 150 millimicrons. The temperatures at which milling is carried out will also influence the basicity, since the greater the heat, the less ammonia is dissolved. At normal pressure, we commonly employ temperatures of between about 0° and 90° C., and generally prefer to operate under most commercial conditions at room temperature; the heat of reaction itself (the reaction being exothermic) and the mechanical grinding will usually combine to heat the system further by 20° to 25° or so.

In the operation of batch processes care must be taken to control the ratio of silicon to liquid. For a given ratio, if milling is carried on for too long, it is obvious that the liquid will be consumed, water being decomposed to evolve hydrogen. Where the batch is to be milled for an extended period of time, there should be low Si content compared to the liquid, or else the product gel will be lumpy or sandy in character and contain considerable unreacted silicon. For batchwise operation using steel or porcelain ball mill equipment, we have found that the following proportions for given milling times and product sols are advisable: for 1 hour of milling, an initial charge of 1-2 ml. liquid per gram of Si will give about a 34% $SiO_2$ sol; for 2 hours of milling, 5 ml. per gram will furnish a 20 to 24% $SiO_2$ sol; and after 3 hours of milling, a starting liquid-Si ratio of 6 to 8 ml. per gram provides a 20-30% $SiO_2$ product.

Contrary to previous observations, we find it unnecessary to employ hyperpure silicon. While such material may of course be used, silicon of, say, 98% purity is equally effective and reaction is just as rapid. Ferrosilicon is also useful, as well as other alloys; however, the silicon content thereof should be relatively high, preferably at least 90%, to minimize the presence of off-color impurities in the product, and also to insure appreciable rate of reaction.

Finishing of the sols may be by any usually-accepted, conventional means. The liquid can be drained off, for instance, and clarified by filtering or centrifuging. The product may be concentrated by evaporation at low pressure, if desired. The centrifuged residue, which is enriched in silicon, may be recycled to a ball-milling operation, in which case efficiency of silicon utilization is increased. For instance, in a continuous operation where the effluent is recycled after centrifuging, Si efficiency is increased from 65% to 75%. Because of the tendency of hydrophilic sols to gel on standing, it is generally preferable to prepare the hydrophobic material with ammonia first. This sol may be stored for weeks or months without gelling. When the hydrophilic type is desired, this hydrophobic material may be converted thereto by the addition of an amine.

The specific particle size data, hereinabove-mentioned generally and hereinafter reported with particularity in our experiments, were obtained by measurements from electron microscope photographs. Conventional 200 - mesh specimen screens were coated on one side with a film (about 10 millimicrons thick) of essentially transparent nitrocellulose. On top of this was cast a film comprising a dispersion of the particles to be examined. This specimen screen was then positioned beside a source of chromium metal, said metal being evaporated and the vapors passing to the screen to deposit thereon. Such "shadowcasting" technique is commonly employed when, as here, the size range of the particles under study would render the electron microscope otherwise inefficient. The specimen screens could then be placed as usual under an electron microscope and photographs taken of various fields.

The following examples are given to illustrate our invention, but not in any way to limit its scope:

Example I 100 grams of commercial silicon, comprising granules approximately 60-mesh or coarser, were charged into a one-gallon porcelain ball mill, containing one to one-half inch diameter flint balls as the grinding means. 750 ml. of 28% by weight $NH_3$ solution were added thereto, and the mixture was milled for 3 hours. The resulting dispersion was centrifuged to clarify and remove solid contaminants, and the fluid product analyzed. This product comprised a water-thin, milky, opaque sol containing 28% $SiO_2$. Its characteristics showed that the sol was hydrophobic; particle size of the $SiO_2$ therein was 90 to 100 millimicrons.

Example II

A steel ball mill was here employed, wherein the grinding charge comprised lump silicon of one to two inches in diameter; this charge filled the mill about one-half full, requiring about 15 to 16 lbs. of the silicon. A mixture of 150 ml. of 28% ammonia and 1350 ml. of water was introduced and milling begun at room temperature. The mill was operated continuously for 60 hours, except for periodic stoppage, about every 8 hours, to add one or two more lbs. of lump silicon. More of the same ammonia solution was continuously aded at the rate of 750 ml. per hour, and overflow was removed from the mill similarly, by means of two coaxial tubes in the wall of the mill.

When operation was discontinued, the sol product, after conventional clarification, was translucent and water-thin, not milky and opaque like the product of Example I. $SiO_2$ content was 11.1%. This sol was concentrated by boiling at reduced pressure, a water aspirator being connected to the flask, until an $SiO_2$ content of 30% was reached. This sol was still translucent and water-thin. $SiO_2$ particle size was between 50 and 60 millimicrons.

Example III

The conditions of Example II were repeated, with the single exception that the rate of addition of the ammonia mixture was cut in half: i. e., 375 ml. per hour were introduced. The product of this procedure had an $SiO_2$ concentration of about 16%, and the particle size was 40 millimicrons before concentration.

Example IV

The porcelain ball mill, about one-half full of flint balls, was utilized as in Example I. 100 grams of the same type of silicon as Example I, and 1,000 ml. of an aqueous solution of tetraethylenetetramine (5% by volume) were charged thereto at room temperature. The system was ground 3 hours and centrifuged. A translucent sol containing 13.8% $SiO_2$ resulted. However, unlike the experiments wherein ammonia was employed, this sol was viscous and gelled in two days, even though kept in a tightly-closed container to inhibit evaporation. Thus it was shown that the sol was hydrophilic. Particle size of this material was difficult to obtain because the product was aggregated and most difficult to disperse; however, its ultimate size appeared to be less than 40 millimicrons.

Example V

A steel ball mill, charged one-half full with one to one-half inch diameter flint balls, was used for this reaction. The grinding system comprised 1000 ml. of hot water, 500 ml. of room temperature 28% $NH_3$, 400 grams of granular silicon, and 20 ml. of tetraethylenetetramine. Temperature of this mixture as milling started was 68° C., and at the end of the one-hour grinding period employed, it reached 72°. This sol was clarified by the usual centrifuging, and $SiO_2$ content was found to be 12.7%. Despite the small quantity of amine employed together with the $NH_3$ (less than 2% by volume of the system), the sol was thicker and hydrophilic. It was translucent, and $SiO_2$ particle size was about 20 millimicrons.

Example VI

A porcelain ball mill one-half full of flint balls was again employed. A mixture of ten grams of granular silicon and 750 ml. of 28% ammonia, at room temperature, was milled for 5 hours and centrifuged. This product was a milky, water-thin sol containing 5.3% $SiO_2$, the particle size of which was in the range of 80 to 90 millimicrons.

Example VII

The steel ball mill and flint balls of Example V were utilized to grind together 400 grams of silicon, 268 ml. of 28% $NH_3$ and 1232 ml. of water. Milling time was 2 hours; and the clear, thin sol produced contained 19.4% $SiO_2$. This $SiO_2$ was of very fine particle size, namely, 10 to 15 millimicrons.

The advantages of our method are obvious. We have made it at last possible to react silicon directly and efficiently with water in the presence of a weak base, without the disadvantageous formation of a stable $SiO_2$ coating on the silicon; and we have thereby produced fine particle size silica sols which may be hydrophobic or hydrophilic, as desired. By inter-relating the time and type of milling, the silicon: liquid system ratio, the temperatures, and the alkali concentration, we have provided a quick and simplified method for controlling the $SiO_2$ content and particle size of the resulting sols. Additionally, we have devised a continuous commercial operation, more efficient and economical than the usual batch processes.

We claim as our invention:

1. A process for the production of silica sols through reaction of silicon with water which comprises effecting said reaction while removing silica coating as formed from the silicon reactant by subjecting said silicon to attrition milling while it is submerged in an aqueous solution of a weak base selected from the group consisting of from 1% to 28% by weight of ammonia and from 1% to 35% by weight of amines.

2. A process for the preparation of hydrophobic silica sols which comprises subjecting silicon to ball-milling attrition while it is submerged in an aqueous solution containing from 1% to 28% by weight of ammonia.

3. A process for the preparation of hydrophilic silica sols through reaction of silicon with water which comprises effecting said reaction while removing silica coating as formed from the silicon reactant by subjecting said silicon to ball-milling attrition while it is submerged in an aqueous solution containing from 1% to 35% by weight of a water-soluble amine having a basicity between pH 6 and pH 12.

4. A process for the preparation of hydrophobic silica sols which comprises mechanically grinding in a vented ball mill a dispersion of silicon submerged in water containing between about 1% and 28% by weight of ammonia.

5. A continuous process for the preparation of silica sols through reaction of silicon with water which comprises effecting said reaction while removing silica coating as formed from the silicon reactant by ball-milling said silicon in an aqueous system containing a weak base selected from the group consisting of from 1% to 28% by weight of ammonia and from 1% to 35% by weight of amine derivatives of ammonia, continuously adding fresh amounts of said base to said aqueous system, and continuously draining off the product sol.

6. A process for preparing a hydrophilic silica sol through reaction of silicon with water which comprises effecting said reaction while removing silica coating as formed from the silicon reactant by subjecting said silicon to attrition in a vented ball mill and while submerged in a dilute aqueous solution containing from 1% to 35% by weight of a water-soluble amine having a basicity of between pH 6 and pH 12.

VICTOR I. MONTENYOHL.
CARL M. OLSON.

REFERENCES CITED

The following references are of record in the file of this patent:

UNITED STATES PATENTS

| Number | Name | Date |
| --- | --- | --- |
| 899,875 | Kuzel | Sept. 29, 1908 |
| 1,223,350 | Acheson | Apr. 24, 1917 |
| 1,797,760 | De Rohden | Mar. 24, 1931 |
| 1,969,242 | Szegvari | Aug. 7, 1934 |
| 2,085,129 | Stoewener | June 29, 1937 |
| 2,173,430 | Vogel | Sept. 19, 1939 |
| 2,348,736 | Heath | May 16, 1944 |

FOREIGN PATENTS

| Number | Country | Date |
| --- | --- | --- |
| 301,805 | Great Britain | Mar. 3, 1930 |